United States Patent
Xu et al.

(10) Patent No.: US 7,536,059 B2
(45) Date of Patent: *May 19, 2009

(54) LUMINANCE PRESERVING COLOR QUANTIZATION IN RGB COLOR SPACE

(75) Inventors: Ning Xu, Irvine, CA (US); Yeong-Taeg Kim, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 683 days.

This patent is subject to a terminal disclaimer.

(21) Appl. No.: 10/985,364

(22) Filed: Nov. 10, 2004

(65) Prior Publication Data

US 2006/0098885 A1    May 11, 2006

(51) Int. Cl.
*G06K 9/36* (2006.01)
(52) U.S. Cl. ........................... 382/251; 382/166
(58) Field of Classification Search ........... 382/167, 382/162, 166, 251, 248, 240; 345/589, 603, 345/591, 428, 419, 473; 358/1.9, 518, 523; 341/51, 107
See application file for complete search history.

(56) References Cited

U.S. PATENT DOCUMENTS

| | | | | | |
|---|---|---|---|---|---|
| 5,640,159 | A | * | 6/1997 | Furlan et al. | 341/51 |
| 5,687,307 | A | * | 11/1997 | Akisada et al. | 345/428 |
| 6,259,819 | B1 | * | 7/2001 | Andrew et al. | 382/248 |
| 6,330,075 | B1 | * | 12/2001 | Ishikawa | 358/1.9 |
| 7,038,814 | B2 | * | 5/2006 | Huovinen | 358/1.9 |
| 7,298,379 | B2 | * | 11/2007 | Xu et al. | 345/589 |
| 2006/0176313 | A1 | * | 8/2006 | Xu et al. | 345/603 |

OTHER PUBLICATIONS

H. Kikuchi, H. Sato, S. Hasebe, N. Mizutani, S. Muramatsu, S. Sasaki, Z. Zhou, S. Sekine, Y. Abe, M. Nakashizuka, *Mapping of Fine Grayscale Data into the sRGB Color Space*, in Proc. ITC-CSCC 2002, Jul. 2002, pp. 16-19, Thailand.

C.W. Tyler, H. Chan, L. Liu, B. McBride, L. Kontsevich, *Bit-Stealing: How to get 1786 or More Grey Levels from an 8-Bit Color Monitor*, SPIE Proceedings, 1992, pp. 351-364, vol. 1665.

D.B. Judd, G. Wyszecki, *Color in Business*, Science and Industry, pp. entire textbook, 1975, 3rd ed., Wiley, New York.

C.A. Poynton, *A Technical Introduction to Digital Video*, 1996, pp. entire textbook, John Wiley & Sons, Inc.

* cited by examiner

*Primary Examiner*—Anh Hong Do
(74) *Attorney, Agent, or Firm*—Kenneth L. Sherman, Esq.; Michael Zarrabian, Esq.; Myers Andras Sherman LLP

(57) ABSTRACT

A color quantization method in RGB color space which preserves high precision of luminance information in an original high precision RGB image signal which is quantized to a lower precision (lower bit depth) RGB signal. The method can be used to convert the original RGB signal to arbitrary quantization levels in RGB space.

20 Claims, 3 Drawing Sheets

LUMINANCE PRESERVING COLOR QUANTIZATION IN RGB COLOR SPACE

FIELD OF THE INVENTION

The present invention relates generally to video image color quantization in image processing and in particular to color quantization within the RGB color space.

BACKGROUND OF THE INVENTION

RGB (Red, Green, Blue) color space, especially the one with 24-bit true color, is used in virtually every computer system as well as other applications such as television, video, etc. For display on RGB displays, images resulting from a higher precision capturing or processing system must be quantized into RGB signals of the same quantization levels of the display. The traditional true color display with 8-bit precision in each channel can display about 16.7 million colors. Although, based on research in color science, human eye can only distinguish around 10 million different colors under optimal viewing condition, the true color display is still not detailed enough for human vision perception.

This is mainly because of the non-uniformity, in the sense of human perception, of the RGB space. The non-uniformity leads to the result that in some regions of the RGB color space the different colors are perceived the same and in some other regions the colors jump by more than one JND (just noticeable difference). For quantization in the regions where colors jump by more than one JND, the quantization error is noticed by human visual system. At the same time, human visual system is much more sensitive in luminance than in chrominance. Research shows that the human eye can discern approximately 463 different gray scales, which is about 9-bits, while it can only distinguish about 150 different hues and 50 different saturation levels.

The above two properties (i.e., the non-uniformity of RGB space and high accuracy of luminance discernment), can be checked easily using an 8-bit grayscale ramp image. The traditional 24-bit true color display can display 255 different shades of grayscales with perceivable banding artifacts. When the display is made brighter, lack of bit-depth makes the banding artifacts more obvious between neighboring shades of gray scales in 24-bit displays.

The fact that human vision is much more sensitive in luminance than in chrominance, makes it possible to manipulate the quantized color signals to preserve higher precision of luminance while keeping the difference of the chrominance signals within a tolerable range.

BRIEF SUMMARY OF THE INVENTION

In one embodiment the present invention provides a color quantization method in RGB color space which preserves high precision of luminance information in an original high precision RGB image signal which is quantized to a lower precision (lower bit depth) RGB signal. The method preserves luminance information, and this is different from the conventional method that uses simple rounding. It can be used to convert the original RGB signal to arbitrary quantization levels in RGB space.

As mentioned, because the human eye is much more sensitive in luminance than chrominance, an object of the present invention is to preserve luminance value precisely. This objective is achieved by minimizing the luminance difference between the input signal and output signal on the grid of low bit depth RGB signals. However, as minimization of the luminance might result in large a difference in the chrominance components, to keep the color difference within a tolerable range, the quantization problem is formulated as a constrained minimization problem.

As such, an example method of video image color quantization according to the present invention, comprises the steps of: receiving an image signal comprising RGB signals having a first precision; quantizing the image signal into a quantized RGB signal having a second precision lower than the first precision; such that the luminance of the image signal is essentially preserved in the quantized RGB signal. The luminance information of the image signal is determined; and the quantization error in luminance information of the image signal is essentially minimized by trading off the quantization error in chrominance information of the image signal. Minimizing the quantization error in luminance information of the image signal, includes the steps of constraining chrominance errors while essentially minimizing luminance quantization errors.

In another example, the quantization step further includes the steps of: determining a set of possible RGB signal values for the quantized signal such that the difference in chrominance before and after quantization is constrained; and selecting an RGB signal value from the above possible RGB signal values that essentially minimizes the difference in luminance before and after quantization.

In another aspect the present invention provides a quantizer and video system that implement the above example methods.

BRIEF DESCRIPTION OF THE DRAWINGS

Other embodiments, features and advantages of the present invention will be apparent from the following specification taken in conjunction with the following drawings.

DETAILED DESCRIPTION OF THE INVENTION

In one embodiment, the present invention provides a color quantization method in RGB color space which preserves high precision of luminance information in an original high precision RGB image signal which is quantized to a lower precision (lower bit depth) RGB signal.

The quantization method can be used for quantizing RGB signals into arbitrary quantization levels in RGB space. To simplify the description herein, an example quantization method from double precision RGB to 24-bit RGB is described. The quantization method can be used to convert the original RGB signal to arbitrary quantization levels in RGB space. For simplicity of description, in the following, color components are represented by upper case letters (RGB) to indicate 8-bit values, and by lower case letters (rgb) to indicate the higher precision values, more bits or double precision.

The problem of color quantization to true RGB color space is to find an 8-bit RGB triple to represent the higher precision rgb values. The common practice for color quantization is to round an original rgb value to its nearest RGB quantization level. However, as mentioned, because the human eye is much more sensitive in luminance than chrominance, the quantization errors from simple rounding are perceptually non-uniform for luminance and chrominance components.

According to an embodiment of the present invention, to obtain a 24-bit RGB image from high precision signals, the quantization error in luminance components is minimized by trading off the quantization errors in chrominance components. In other words, a set of 8-bit RGB triple are found such that the quantization error in luminance components is minimized.

Figure 1:
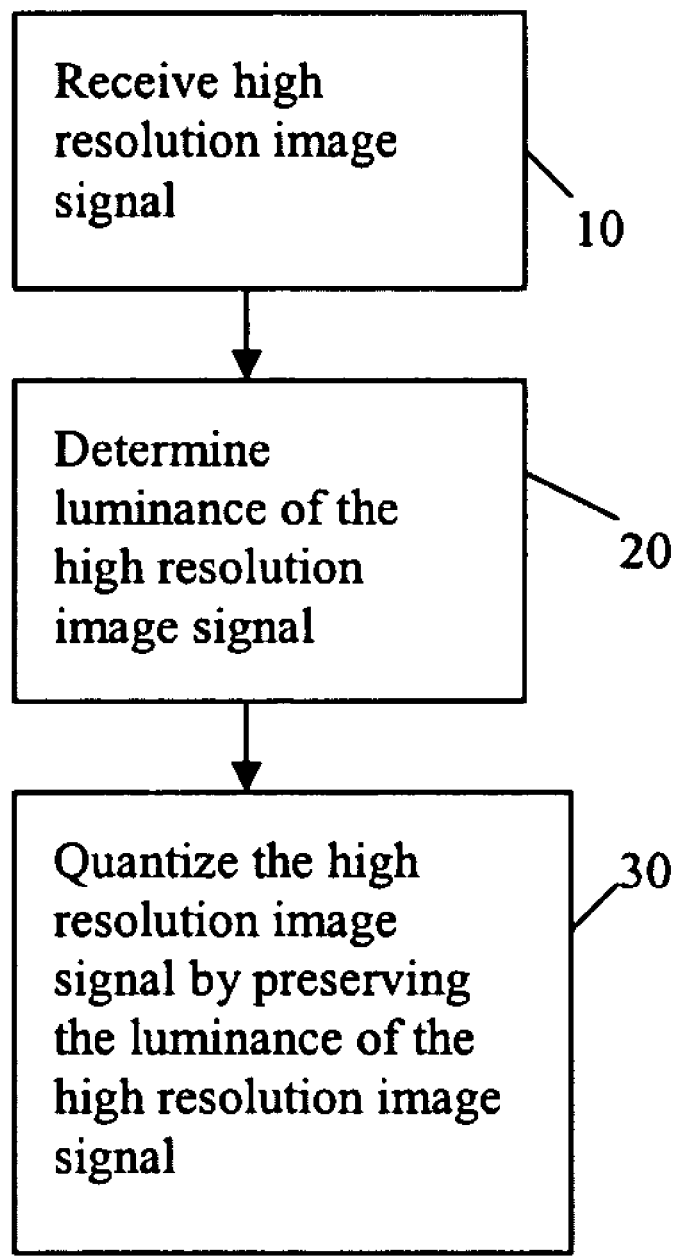
FIG. 1 shows an example flowchart of the steps of an embodiment of a quantization method according to the present invention which quantizes a high resolution image signal by preserving the luminance of the high resolution image signal.

Referring to the example flowchart in FIG. 1, in such a method, after receiving the high precision RGB image signal (step 10), the luminance information of the high precision RGB value signal is computed (step 20). There are different coefficients $M_1$ to calculate the luminance value, y, of an RGB signal. An example is shown in relation (1) below:

$$Y = M_1 \cdot \begin{bmatrix} r \\ g \\ b \end{bmatrix} \quad (1)$$

$$= [0.299 \ 0.587 \ 0.114] \cdot \begin{bmatrix} r \\ g \\ b \end{bmatrix},$$

where r, g, b and y are high precision values. The resulting high precision luminance information y is to be preserved when the original RGB signal $[r, g, b]^T$ (wherein T means transpose) is quantized to 8-bit RGB colors for display.

The quantization error in RGB color space can be transformed back to obtain the quantization error of luminance, which should be minimized by trading off the quantization errors in chrominance components. In other words, a set of 8-bit RGB triple are found such that the luminance difference between the quantized RGB triple and the original rgb triple is reduced and preferably essentially minimized. However, this minimization of the luminance component is achieved at the cost of increasing the quantization errors in chrominance components. Therefore, the chrominance errors are constrained while minimizing luminance quantization errors to keep the color difference between the original high precision signal and the low precision signal within a tolerable range (step 30).

As such, the quantization problem is formulated as a constrained minimization problem. The quantization errors in luminance can be minimized while ensuring that the difference between colors before and after quantization is constrained, such as according to relation (2) below:

$$\begin{bmatrix} R \\ G \\ B \end{bmatrix} = \arg \min_{[R,G,B]^T \in D(r,g,b)} \left\| M_1 \cdot \begin{bmatrix} r-R \\ g-G \\ b-B \end{bmatrix} \right\|, \quad (2)$$

where D(r,g,b) is a range that for colors $[R, G, B]^T \in D$, such that the chrominance difference between $[R,G,B]^T$ and $[r,g,b]^T$ is tolerable (wherein $$\arg\min_{x \in S} f(x)$$

is the x that minimizes f(x)).

If the setup parameters of a display is known (e.g., the system white point, chromaticity coordinates of R, G and B, and the gamma law), in one example, the colors can be converted into device independent color space, e.g., CIE Lab color space, and the CIE 1994 color difference model is used to calculate the color difference between the high precision $[r,g,b]^T$ color and the 8-bit $[R,G,B]^T$. The CIE 1994 color difference model is based on CIE Lab and attempts to derive local distortions of the CIE Lab to make the color difference more uniform in the color space. CIE Lab color space is directly based on CIE XYZ, which is device independent and at the root of all colorimetry. CIE94 color difference DE*94 is defined on CIE Lab color space as described below.

For two colors $C_1 = [L_1, a_1, b_1]^T$ and $C_2 = [L_2, a_2, b_2]^T$ i color difference DE*94 is as example relation (3) below (where L, a, b are the coordinates in CIE Lab color space, as in r,g,b for RGB color space):

$$DE^*94(C_1, C_2) = \sqrt{\left(\frac{dl}{kl \cdot sl}\right)^2 + \left(\frac{dc}{kc \cdot sc}\right)^2 + \left(\frac{dh}{kh \cdot sh}\right)^2}, \text{ where} \quad (3)$$

$$dl = L_1 - L_2,$$

$$dh = \begin{cases} \sqrt{de^2 - dl^2 - dc^2} & \text{if } de^2 > dl^2 + dc^2 \\ 0 & \text{else} \end{cases},$$

$$de = \sqrt{(L_1 - L_2)^2 + (a_1 - a_2)^2 + (b_1 - b_2)^2},$$

$$dc = c_2 - c_1$$

$$= \sqrt{a_1^2 + b_1^2} - \sqrt{a_2^2 + b_2^2},$$

$$= \sqrt{a_1^2 + b_1^2} - \sqrt{a_2^2 + b_2^2}, \text{ and}$$

$$kl = kc = kh = 1,$$

$$sl = 1,$$

$$sc = 1 + 0.045 \cdot c,$$

$$sh = 1 + 0.015 \cdot c, \text{ where}$$

$$c = \sqrt{c_1 \cdot c_2}.$$

With the help of the CIE 1994 color difference model, the quantization is formulated as minimizing the difference between the real luminance value represented by $[r,g,b]^T$ color and the luminance value represented by 8-bit $[R,G,B]^T$, with the constraint that the color difference between them, expressed in DE* 94, is smaller than a threshold in the example relation (4) below:

$$\begin{bmatrix} R \\ G \\ B \end{bmatrix} = \arg \min_{DE^*94 < Threshold} \left\| M_1 \cdot \begin{bmatrix} r-R \\ g-G \\ b-B \end{bmatrix} \right\|. \quad (4)$$

In order to reduce the computation needed for this minimization for real-time conversion of TV signals, a simpler format can be implemented according to another aspect of the present invention. The main idea is same as above, however DE* 94 is not calculated. Instead, a small range is defined as: $\{[R,G,B]^T | R \in \{\lfloor r \rfloor, \lceil r \rceil\}, G \in \{\lfloor g \rfloor, \lceil g \rceil\}, B \in \{\lfloor b \rfloor, \lceil b \rceil\}\}$, where $\lfloor \bullet \rfloor$ is the nearest quantization level that is less than or equal to $\bullet$, and $\lceil \bullet \rceil$ is the nearest quantization level that is greater than or equal to $\bullet$. In other words, the [R, G,B] can take values only at the eight vertices of the unit cube that contains high precision value $[r,g,b]^T$. Then, the minimization can be according to example relation (5) below:

$$\begin{bmatrix} R \\ G \\ B \end{bmatrix} = \arg \min_{\substack{R \in \{\lfloor r \rfloor, \lceil r \rceil\} \\ G \in \{\lfloor g \rfloor, \lceil g \rceil\} \\ B \in \{\lfloor b \rfloor, \lceil b \rceil\}}} \left\| M_1 \cdot \begin{bmatrix} r - R \\ g - G \\ b - B \end{bmatrix} \right\|. \quad (5)$$

Figure 2:
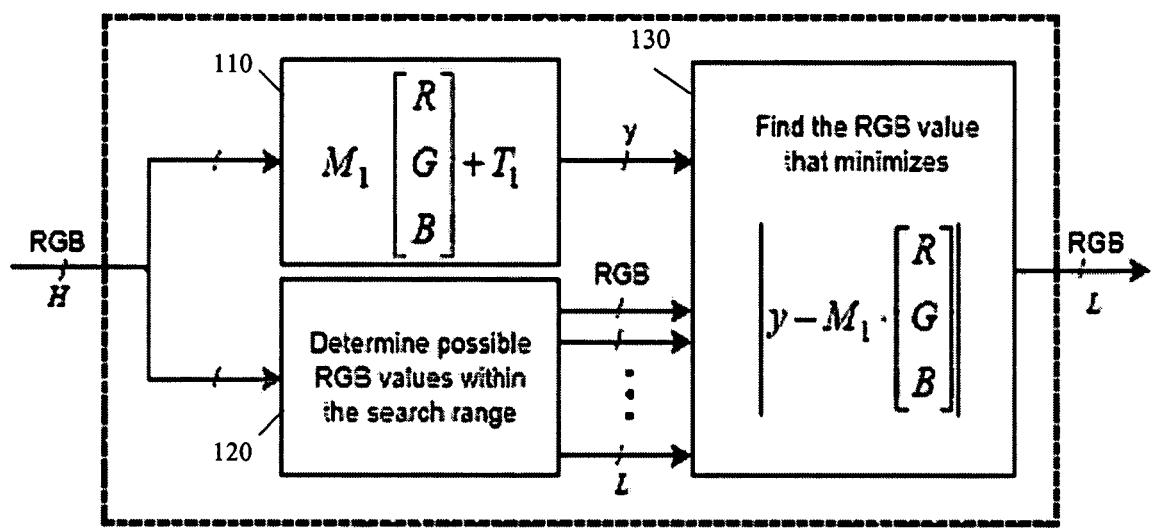
FIG. 2 shows a functional block diagram of an embodiment of a luminance preserving quantizer according to the present invention.

This minimization problem can be solved by an exhaustive search wherein the resulting images from the quantization method contain color values that have higher precision on luminance value. FIG. 2 shows an example functional block diagram of an embodiment of a quantizer 100 according to the present invention that implements the above process for luminance preserving quantization of high precision RGB signal. The quantizer 100 comprises a block 110 that determines the luminance of the original high resolution RGB input signal, a block 120 that determines possible RGB values within said small range, and a block 130 that selects the RGB value among the possible RGB values which essentially minimizes the difference in luminance before and after the quantization.

The error in luminance value (y) of a pixel is then contained in a smaller range than the direct rounding quantization. Table I below summarizes the luminance difference Δy between the 8 different possible quantized RGB colors and color $[\lfloor r \rfloor, \lfloor g \rfloor, \lfloor b \rfloor]^T$, where $\Delta RGB = [R - \lfloor r \rfloor, G - \lfloor g \rfloor, B - \lfloor b \rfloor]^T$, and the difference in luminance is: $\Delta y = M_1 \cdot \Delta RGB$.

Therefore, the quantized 8-bit RGB values preserved luminance precision as high as 8+2.43=10.43 bit.

Using the above quantization method, the original high precision rgb signal can be quantized to a 24-bit RGB while signal preserving high precision luminance value and keeping small color difference. The high precision luminance is achieved at the cost of the precision of chrominance, which is less sensitive in human eyes.

Figure 3:
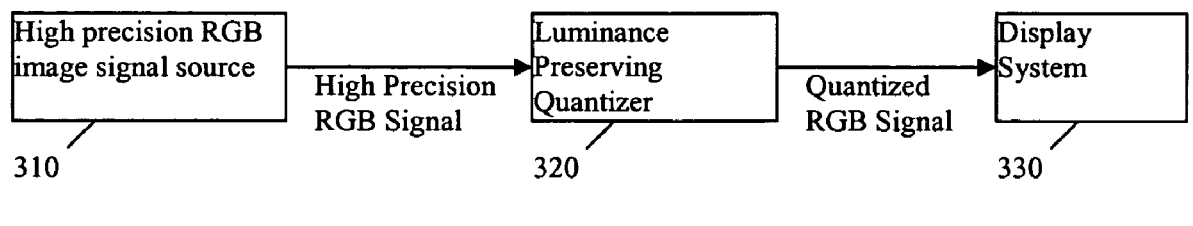
FIG. 3 shows an example functional block diagram of a video system including a quantizer that quantizes an input high resolution image signal by preserving the luminance of the high resolution image-signal, according to the present invention.

FIG. 3 shows an example functional block diagram of a video system 200 according to the present invention including a high precision RGB image signal source 310, a quantizer 320 that quantizes the high resolution image signal by preserving the luminance of the high resolution image signal, and a display system 330 for displaying the quantized signal.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention, can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

TABLE I

LUMINANCE DIFFERENCES FOR EACH POSSIBLE QUANTIZATION RGB VALUE COMPARED WITH $[\lfloor r \rfloor, \lfloor g \rfloor, \lfloor b \rfloor]^T$.

| ΔRGB | [0, 0, 0] | [0, 0, 1] | [0, 1, 0] | [0, 1, 1] | [1, 0, 0] | [1, 0, 1] | [1, 1, 0] | [1, 1, 1] |
|---|---|---|---|---|---|---|---|---|
| Δy | 0 | 0.114 | 0.587 | 0.701 | 0.299 | 0.413 | 0.886 | 1 |

Because the quantization process minimizes the luminance difference Δy, the reachable luminance steps δy are much smaller than that can be represented by 8-bit Y value. Δy in Table I is sorted and δy is calculated and shown in Table II below:

TABLE II

REACHABLE LUMINANCE STEPS.

| Index | 0 | 1 | 2 | 3 | 4 | 5 | 6 | 7 |
|---|---|---|---|---|---|---|---|---|
| Δy | 0 | 0.114 | 0.299 | 0.413 | 0.587 | 0.701 | 0.886 | 1 |
| δy |  | 0.114 | 0.185 | 0.114 | 0.174 | 0.114 | 0.185 | 0.114 |

As can be seen in Table II, the biggest luminance step δy is 0.185. Its equivalent bit-depth of luminance value Y is increased by δd bit, where $$\delta d = \log_{0.5} 0.185$$
$$= 2.43 \text{ bit.}$$

What is claimed is:

1. A method of video image color quantization, comprising the steps of:
   using a quantizer for:
   receiving an image signal comprising RGB signals having a first precision;
   quantizing the image signal into a quantized RGB signal having a second precision lower than the first precision;
   such that a luminance of the image signal is essentially preserved in the quantized RGB signal, wherein the steps of quantizing further includes the steps of essentially minimizing quantization errors in luminance of the image signal while ensuring that a difference in chrominance before and after quantization is constrained.

2. The method of claim 1 wherein the step of quantizing further includes the steps of essentially minimizing quantization error in luminance information of the image signal.

3. The method of claim 1 wherein the step of quantizing further includes the steps of:
 determining the luminance information of the image signal;
 essentially minimizing the quantization error in luminance information of the image signal by trading off the quantization error in chrominance information of the image signal.

4. The method of claim 3 wherein the step of essentially minimizing the quantization error in luminance information of the image signal, further includes the steps of constraining chrominance errors while essentially minimizing luminance quantization errors.

5. The method of claim 3 wherein the step of essentially minimizing the quantization error in luminance information of the image signal, further includes the steps of constraining chrominance errors while essentially minimizing luminance quantization errors to keep the color difference between the image signal and the quantized RGB signal within a tolerable range.

6. The method of claim 1 wherein the steps of quantizing further includes the steps of formulating and solving a constrained minimization problem to essentially preserve the luminance of the original signal in the quantized RGB signal.

7. The method of claim 1 wherein the first precision is high precision and the second precision is low precision, wherein both the first and second precisions can have arbitrary quantization levels.

8. The method of claim 2 wherein the step of essentially minimizing further includes the steps of finding a set of n-bit RGB triples for the quantized RGB signal such that the quantization error in luminance components is essentially minimized.

9. The method of claim 1 wherein the quantization step further includes the steps of:
 determining a set of possible RGB signal values for the quantized signal such that the difference in chrominance before and after quantization is constrained; and
 selecting an RGB signal value from the above possible RGB signal values that essentially minimizes the difference in luminance before and after quantization.

10. The method of claim 9 wherein the set of possible RGB signal values (R,G,B) for the quantized RGB signal is within a range defined as: $\{[R,G,B]^T | R \in \{\lfloor r \rfloor, \lceil r \rceil\}, G \in \{\lfloor g \rfloor, \lceil g \rceil\}, B \in \{\lfloor b \rfloor, \lceil b \rceil\}\}$, image signal values.

11. A video image color quantization system, comprising:
 a quantizer that receives an image signal comprising RGB signals having a first precision, and quantizes the image signal into a quantized RGB signal having a second precision lower than the first precision, such that a luminance of the image signal is essentially preserved in the quantized RGB signal, wherein the steps of quantizing further includes the steps of essentially minimizing quantization errors in luminance of the image signal while ensuring that a difference in chrominance before and after quantization is constrained.

12. The system of claim 11 wherein the quantizer further essentially minimizes quantization error in luminance information of the image signal.

13. The system of claim 11 wherein the quantizer further determines the luminance information of the image signal, and essentially minimizes the quantization error in luminance information of the image signal by trading off the quantization error in chrominance information of the image signal.

14. The system of claim 13 wherein the quantizer further essentially minimizes the quantization error in luminance information of the image signal, by constraining chrominance errors while essentially minimizing luminance quantization errors.

15. The system of claim 13 wherein the quantizer further essentially minimizes the quantization error in luminance information of the image signal, by constraining chrominance errors while essentially minimizing luminance quantization errors to keep the color difference between the image signal and the quantized RGB signal within a tolerable range.

16. The system of claim 11 wherein the quantizer further solves a constrained minimization problem to essentially preserve the luminance of the original signal in the quantized RGB signal.

17. The system of claim 11 wherein the first precision is high precision and the second precision is low precision, wherein both the first and second precisions can have arbitrary quantization levels.

18. The system of claim 12 wherein the quantizer further finds a set of n-bit RGB triples for the quantized RGB signal such that the quantization error in luminance components is essentially minimized.

19. The system of claim 11 wherein the quantizer further determines a set of possible RGB signal values for the quantized signal such that the difference in chrominance before and after quantization is constrained, and further selects an RGB signal value from the above possible RGB signal values that essentially minimizes the difference in luminance before and after quantization.

20. The system of claim 19 wherein the set of possible RGB signal values (R,G,B) for the quantized RGB signal is within a range defined as: $\{[R,G,B]^T | R \in \{\lfloor r \rfloor, \lceil r \rceil\}, G \in \{\lfloor g \rfloor, \lceil g \rceil\}, B \in \{\lfloor b \rfloor, \lceil b \rceil\}\}$, image signal values.

* * * * *